(12) United States Patent  
Greenberg et al.

(10) Patent No.: US 9,021,536 B2  
(45) Date of Patent: Apr. 28, 2015

(54) PROCESS FOR SUBTITLING STREAMING VIDEO CONTENT

(71) Applicant: Stream Translations, Ltd., London (GB)

(72) Inventors: Richard E. Greenberg, Pacific Palisades, CA (US); Bente Cecilie Ottersen, Oslo (NO); Randi Næs, Oslo (NO)

(73) Assignee: Stream Translations, Ltd., London (GB)

( * ) Notice: Subject to any disclaimer, the term of this patent is extended or adjusted under 35 U.S.C. 154(b) by 0 days.

(21) Appl. No.: 14/018,692

(22) Filed: Sep. 5, 2013

(65) Prior Publication Data

US 2014/0068687 A1  Mar. 6, 2014

Related U.S. Application Data

(60) Provisional application No. 61/697,487, filed on Sep. 6, 2012.

(51) Int. Cl.
| | | |
|---|---|---|
| *H04N 21/485* | (2011.01) | |
| *H04N 7/088* | (2006.01) | |
| *H04N 21/2343* | (2011.01) | |
| *H04N 21/488* | (2011.01) | |

(52) U.S. Cl.  
CPC ......... *H04N 21/4856* (2013.01); *H04N 7/0884* (2013.01); *H04N 21/234336* (2013.01); *H04N 21/4884* (2013.01)

(58) Field of Classification Search  
USPC ............ 725/93, 91, 103, 116, 137, 138, 140, 725/55, 47, 37, 10, 1; 348/464, 468, 473, 348/423.1, 425.4, 495, 500, 521, 525; 386/201, 207, 230, 244, 245, 248, 278, 386/343, 344; 707/736, 758, 760; 709/203, 709/208, 209, 210, 214; 704/2; 715/203  
See application file for complete search history.

(56) References Cited

U.S. PATENT DOCUMENTS

| 7,965,924 B2 * | 6/2011 | Chung et al. ................... 386/344 |
| 8,761,568 B2 * | 6/2014 | Ergin ............................. 386/207 |
| 2005/0152683 A1 * | 7/2005 | Ryu ................................ 386/95 |
| 2008/0187286 A1 * | 8/2008 | Chung et al. .................... 386/95 |
| 2008/0218632 A1 * | 9/2008 | Jung et al. ...................... 348/468 |
| 2010/0332214 A1 * | 12/2010 | Shpalter et al. ................... 704/2 |
| 2011/0137920 A1 * | 6/2011 | Cohen et al. ................... 707/748 |
| 2011/0285726 A1 * | 11/2011 | Redmann ....................... 345/467 |

* cited by examiner

*Primary Examiner* — Jefferey Harold  
*Assistant Examiner* — Mustafizur Rahman  
(74) *Attorney, Agent, or Firm* — Kelly & Kelley, LLP (57) ABSTRACT

A system and process is provided in which original video or dialog content is securely received from the content owner. Subtitle language data is derived, translated, stored and served on a separate database for synchronous playback with the content in video streaming, downloading or online TV following the activation of an option by the end user through a media player.

32 Claims, 3 Drawing Sheets

PROCESS FOR SUBTITLING STREAMING VIDEO CONTENT

BACKGROUND OF THE INVENTION

The present invention generally relates to subtitles of films and television programs for the online market. More particularly, the present invention is directed to a method for purchasing and synchronizing subtitling files with streamed video or other moving image content on-demand from a consumer.

Audiovisual content markets are undergoing significant transformation due to digital technology. Market demand is forcing stakeholders to adapt their business strategies and shaping licensing practices in the sector. Because of the linguistic and cultural specificities across borders, the international market is fragmented. Cultural and linguistic versioning is essential to create consumer demand for each film or television program. The current investment by content owners associated with "localization" including linguistic versioning is considerable. Storing digital subtitle files in multiple languages on a central database separate from the program's master digital files, and making the "localization" a consumer controlled option may facilitate distribution across borders and reduce the need for—and cost of—linguistic versioning.

Subtitles are translated and compressed written versions of spoken dialog in films, television programs and the like for an audience that does not understand the original language, or needs some assistance in understanding/perceiving the dialogue, or wishes to use subtitles as an aid in learning a foreign language.

Subtitles are different from closed captions (for the hard of hearing) in that it is not a verbatim transcription of the dialog and does not contain additional information like "Door creaking", "dog barking", etc. It is the translated visual representation of dialog in synchronous display with the original, spoken dialog as it occurs throughout the course of a film, television program, or other moving images. The placement of these subtitles is variable, but is typically found in a "title-safe area" in the lower third of the displayed program.

Typically there are three steps in creating subtitles:
1) Compressing text and time coding;
2) Translation;
3) Quality Check (QC) Proof reading and technical check;

Specialized computer software and hardware is used by audiovisual translators where the video or moving image files, film, or digital capture is digitally stored on digital media, making each individual frame instantly accessible. Not only does this software position the text in the display area, it also denotes, using time code, the exact positions in the program timeline where each subtitle should appear and disappear. The end result is a subtitle file containing the actual subtitles as well as position or timing markers indicating where each subtitle should appear and disappear. The finished subtitle file is used to add the subtitles to the picture using multiple methods: directly into the picture; or embedded in the vertical interval (video); or later superimposed on the picture by the end user with the help of a browser, an external decoder, or a decoder built into the television; or converted or rendered to TIFF, BMP, SRT graphics or the like that are later superimposed on the picture by the online distribution platform and/or end user's equipment.

Studies indicate that sixty percent of online video consumers watch foreign/international content. Many of these consumers need subtitles to fully enjoy the content that they are watching. Moreover, it is likely that many consumers throughout the world are not buying foreign content because—without subtitles in a language relevant to them—they cannot view and understand films and television content that is produced in a foreign language. Moreover, migration and mobility characterizes much of the world's population today. Thus, there exist many people who live in a country having a dominant language who do not speak that language. Those individuals may need the option of selecting subtitles in languages not normally available in their country or region so as to be able to enjoy the same entertainment as the native speaking population. Globally, 1.2 billion people currently have access to fixed or mobile broadband Internet. Studies indicate that 90 percent of the world's online population is watching video online and 71 percent are willing to pay for online films and video. (Accenture 2013) In 2012 the Global OTT Market represented 10 billion US dollars and is predicted to continue to gain market shares and increase in popularity for the next several years. (OTT or Over-The-Top is content delivered directly over the Internet)

Although some films and television programs are subtitled in foreign languages, in many other instances they are not. Audiovisual translation practices vary from one country to the next, and sometimes even within the same country, depending on whether the work is for box-office release or television, or in terms of the target public (general public, cinema enthusiasts, young viewers, or population with accessibility problems). There are currently no service or services similar to the proposed invention in the streaming, online, and/or mobile platform space. With the increasing popularity and availability of audiovisual entertainment on broadband Internet, new devices, Video-on-Demand, connected TV and other Online Distribution Networks, lack of relevant subtitles in multiple languages regardless of geographic location is limiting the market for content owners as well as consumers.

Accordingly, there is a need for a process for offering subtitles for streamed or downloaded audiovisual content in a manner that alleviates copying and copyright concerns, protects the integrity of the content owner's works, and allows the program provider to derive revenue while easily and relatively inexpensively providing these works with on-demand-access to the appropriate language subtitle to the international online audience.

The present invention fulfills these needs and provides other related advantages.

SUMMARY OF THE INVENTION

The present invention resides in a process and system for offering online subtitle options directly to the end user. The subtitle options can be provided in multiple languages to pay-per-view, I.P., or subscription based users. Obtaining and paying for these subtitles is done in the same simple transaction as for downloading the films, television programs, or other digital content. A central database—typically a cloud-based library of digitized subtitles is built, wherein the end user is given convenient and easy purchase access to the subtitle files, in various languages, that correspond with the film, television program, or other content they select from connected online sale or rental distribution platforms.

The database which is an external, cloud-based third-party server allows secure, partitioned storage of proprietary subtitle files that belong to its content-owning clients. Preexisting subtitle files are collected from the content owners for digitization, adaption and re-editing as necessary. These will be connected to each client's media asset management (MAM) system, so that the subtitle files reside and remain available for synchronized streaming with the content owners' digital assets. A payment system is created so as to easily sell the subtitles to end users through VOD distribution platforms, which revenue can be shared with the owner of the applicable content and/or those creating and providing the subtitled files.

The present invention is directed to a process for delivering subtitles for streamed video or digital moving image content. While the following description may refer to "video file" or "corresponding video file" it is to be understood that the process relates to any video content including film, digital video files, digital moving image files, or any similar content with associated dialog or sound track that could be the subject of subtitling. Use of the phrase "video file" is intended to include all of these forms of video content and others that may be known to those skilled in the art. The process begins with the creation of a subtitle file for a corresponding video file, which subtitle file is synchronized with the corresponding video file. The synchronized subtitle file is stored on a subtitle database separate from a video provider's server or database containing the corresponding video provider's file. The synchronized subtitle file is made available to a consumer through a video provider's distribution server. The consumer is permitted to elect to view the subtitle file which is then displayed simultaneously with the corresponding video file. Of note here is that the subtitle file and the corresponding video file are maintained on separate databases in different locations on the Internet or in the Cloud.

The database may comprise a plurality of subtitle files in multiple languages for each video file. The creating step may begin with the receipt of a dialog script and a working copy of the corresponding video file. An original language master template subtitle file is then prepared using the dialog script in combination with the corresponding video file. The dialog in the original language master template subtitle file is then translated from the original language into a second language. A translated subtitle file in the second language is then created using the translated dialog. This translated subtitle file and the original language master template subtitle file is or becomes part of a library of subtitle files that is maintained on the subtitle database. The translating and creating steps may be repeated for a third language or any number of additional languages, which would themselves become part of the library of subtitle files.

The translating step includes processing the original language master template subtitle file through an interactive statistical machine translation program. This automates the translation of the dialog script from the original language into a second, third, or any number of additional languages. It is worth noting that this translation is always from the original language rather than one of the subsequent translations. This minimizes propagation of translation errors from one language to another. From the interactive statistical machine translation program a draft of the translated subtitle file in the second language is generated. This draft of the translated subtitle file is reviewed, edited, and customized consistent with the format of the original language master template subtitle file. The interactive statistical machine translation program further includes a translation memory which is implemented to alter the algorithm of the program consistent with syntax, word choice, and style preferences indicated by the reviewing, editing and customizing performed previously.

The process may further include reversioning—recutting or modifying—the video file for a specific geographic territory or country, which may involve resequencing or deleting certain content of the video file. The original language master template subtitle file is then recut to match the reversioned video file. A quality check is performed of the synchronized subtitle file with the corresponding video file to confirm technical specifications, synchronization, check sum, duration, and predetermined identification codes.

The displaying step includes accessing the synchronized subtitle file on the subtitle database and synching playback of the synchronized subtitle file with playback of the corresponding video file on the distribution server. Streaming of the synched playback of the synchronized subtitle file and the corresponding video file is permitted from the distribution server to a video playback device.

The subtitle database may be securely partitioned to include a secure work server for a content owner. The content owner is permitted to post a work copy of the corresponding video file and other material such as a dialog script and existing subtitle files on the secure work server. The original or existing subtitle files are processed to verify their contents, translate into a second language or additional languages, or modify to synchronize with the corresponding video file. The processed subtitle file is evaluated to confirm the accuracy of the processing step. The processed subtitle file is then assigned a synchronized subtitle file code. If it is determined that the processing step was not accurate, the subtitle file is corrected for accurate processing. The evaluating step is then repeated on the corrected subtitle file.

The consumer may be billed through a video provider for viewing the synchronized subtitle file. The availability of the synchronized subtitle file may be limited to a predetermined rental duration or a specified video playback device.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE INVENTION

As shown in the accompanying drawings, for purposes of illustration, the present invention resides in a process for A) creating new or modifying existing subtitle files and B) providing subtitles on-demand for synchronized playback with streamed digital content. Generally, subtitle files are created or collected. These are digitized, re-cut, and adapted as necessary. Typically, the subtitles are encoded in such a manner, such as through EZTitles or various subtitling software programs, such that they would not be accessible to anyone who did not have the ability to decode them at the time they were to be viewed. Such a step typically occurs in the final step of the subtitle creation process. The collected or created subtitle files are stored in a server, which is typically cloud-based. Preferably, the server is partitioned such that the storage of the proprietary programs and subtitles is secure.

By way of explanation, "stream translator" or "ST" refers to the provider or host of the process of the present invention. The "content owner" can be either or both the owner of the applicable film, television program, or other digital work and/or the owner of the subtitle file.

If requested by the content owner, ST will create new subtitle files or modify existing subtitle files. The content owner provides a proxy file—a working copy of the corresponding video file—and, if available, the corresponding original dialog script or existing subtitle file. If necessary, ST staff will manually create a compressed, edited and time-coded subtitle file in the original language or Original Language Master Template (OLMT). The OLMT is a template that can be used for translations into multiple languages for distribution to various territories. Typically, the content owner and the host ST will have previously agreed to a naming convention for all subtitle files.

In some cases, large content owners already have created "world" video files or "super video files" that contain multiple audio channels for different languages and a limited number of existing metadata channels for open and closed captioning, as well as subtitle information and various types of user data. All of these strings are synchronized through the original time code, or synchronized signal that is resident on the master versions. This allows the content owner to ship a single digital video file to multiple territories without having to create multiple versions of that video file for different international language and subtitling requirements. In the case of these "wide" master files, those that contain already encoded, multi-language, subtitle information in their metadata, the host ST will simply offer users a "key" when they click on "subtitle purchase" that will instruct the player on which they are watching the file to reach out to the server, confirm the purchase and open that specific language (metadata) stream or multiple language streams in the now-streaming "wide" master file.

However, narrow digital master files are currently more typical. For years, content owners have been providing territories with the minimum amount of international data that they might require, and because the product was being delivered on videotape, there were significant limitations on how much "real estate" was available for additional information like subtitling tracks, director's commentary, 5.1 stereo audio, etc. These "narrow" files will not contain pre-encoded digital subtitling information, however, they will contain a time-code stream that will allow them to be synchronized with other files.

In the case of the "narrow" master files, the host server will, once again, upon purchase be queried by the streaming player to permit access to the subtitling file that corresponds with a particular movie or television program. The difference, however, is that instead of the use of a simple "key" the subtitling file will either be downloaded onto the streaming player for simultaneous use with the narrow file stream or the subtitling file will be streamed simultaneously in synch with the original narrow file time code information.

Figure 1:
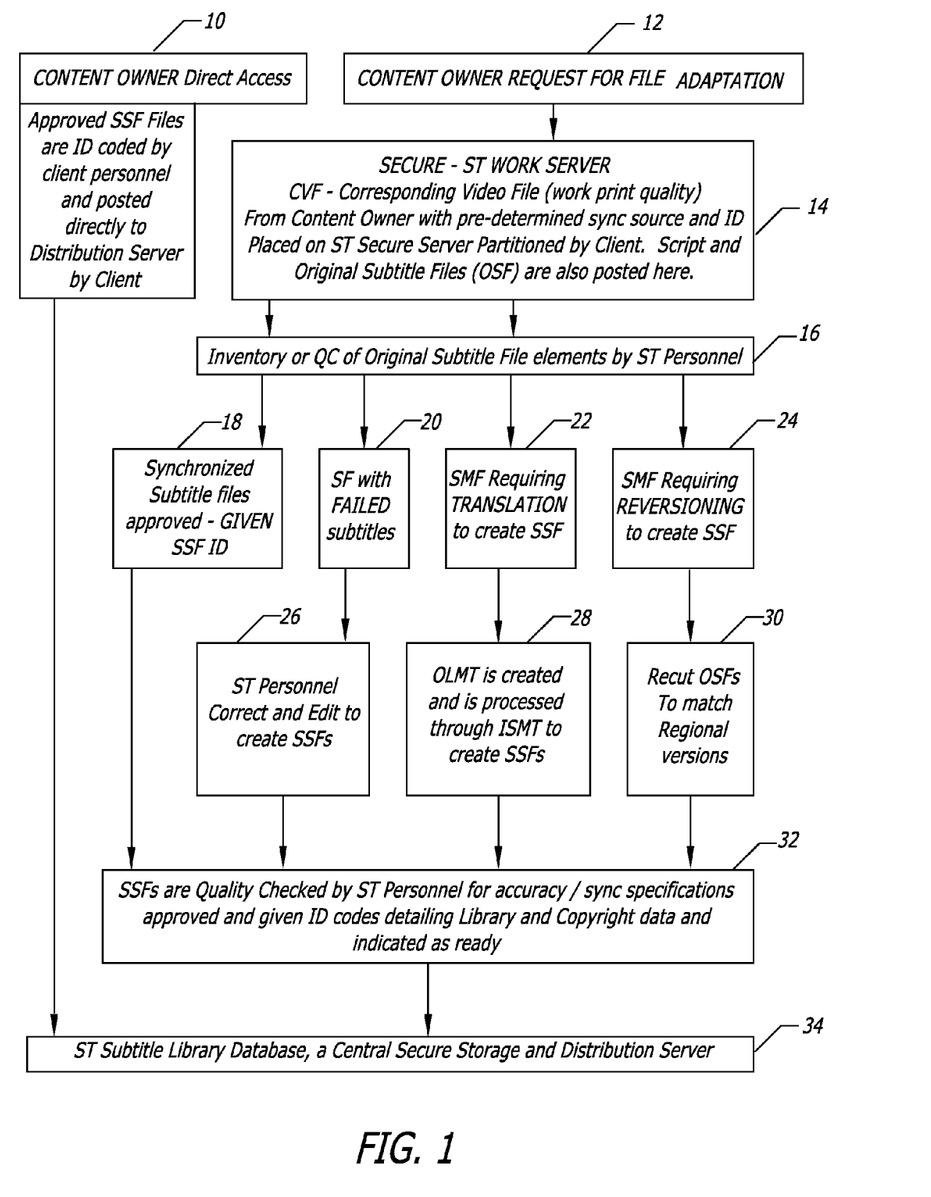
FIG. 1 is a flowchart depicting the steps taken in accordance with the present invention for subtitle file management.

The steps taken in accordance with the processes of the present invention will now be described. As shown in FIG. 1, approved existing subtitle files are posted by the content owner (10) via secure digital connection directly to the ST subtitle database—a secure cloud-based storage and distribution server (34) where they can be made available to consumers on-demand.

All process steps from (14) through (32) are performed at the content owner's request (12).

If verification, translation or modification of subtitle files is requested by content owner (12), a workprint quality CVF (Corresponding Video File), including pre-determined sync source and ID, as well as, dialog script or original subtitle files (OSFs), are posted by the content owner on the secure ST work server partitioned by client. (14).

The unverified or unapproved subtitle files are given an initial evaluation by the host personnel to confirm its attributes (16). This quick check will indicate if the subtitle file is synchronized with the CVF or if adaptation is needed. Subtitle files provided by the content owner, which are accurate subtitle files, are confirmed and given synchronized identification codes (18).

If the subtitle file has failed subtitles (20), the failed subtitle will be corrected, edited and recut to create a synchronized subtitle file (26).

If translation and creation of new subtitle files is required (22), ST personnel will initially create a synchronized master subtitle file in the original language or OLMT (28). A high-quality compressed and time-coded master template is created in the original language by skilled subtitlers. This process is the most demanding part of the subtitling production. At this stage, the flow and rhythm of the language is set, taking into account viewers' reading speed and other factors involved in subtitles synched with video files. This original language master template (OLMT) compressing and time coding process will only need to be done once for each video file. With a high-quality and accurate OLMT subtitle file, the remaining processes are simplified. The OLMT will be processed through an Interactive Statistical Machine Translation program (ISMT) to create a draft version of each language that will be manually reviewed, edited, and customized by language to fit the OLMT format. The ISMT process is always performed on the original language master template subtitle file to each target language for translation. Thus, specialized subtitling personnel are only needed for the OLMT process and human post editors on the translated subtitle files need no special subtitling training, only knowledge of the original language and the target language. This results in more accurate translations of subtitle files by eliminating errors resulting from serial translations from one language to another. It also provides a time savings by allowing for large volumes of translated subtitle files on short schedules. The key to the ISMT process is that it interacts with a human subtitler and learns from previous translations (Translation Memory—TM) and saves considerable time over a strictly manual process. This makes it possible to provide high quality translation systems quickly and easily, for virtually any text type and language pair. Having the ability to "learn" means the ISMT technology will continue to improve as it is used. The ISMT learns from previously translated texts and automatically customizes new translations to mimic the syntax, word choice, and style found in those texts. ISMT relies on machine translation combined with translation memory and human editors to quickly and reliably produce high quality subtitles in large volume when compared with a standard process. ISMT is designed to best exploit the technology to better support subtitler's needs and workflow. ISMT can be seamlessly integrated into existing translation tools and workflows. Machine translation prior to editorial also eliminates many issues regarding copyrights for translation.

If the original subtitle files require reversioning for distribution to specific territories or other purposes (24), host personnel will recut original subtitle files to match specific versions of the corresponding video file (30).

In all cases, the completed, verified SSFs are quality checked against the original CVF for technical specifications, synchronization, including check sum, length, and given ID codes detailing Library and Copyright data and indicated as "ready" (32).

Completed and approved synchronized subtitle files are placed on the host's secure server (The Digital Subtitle Library Database) with metadata to enable synchronization with the corresponding video file on a VOD-distribution network, and made available for purchase by end-users (34).

Figure 2:
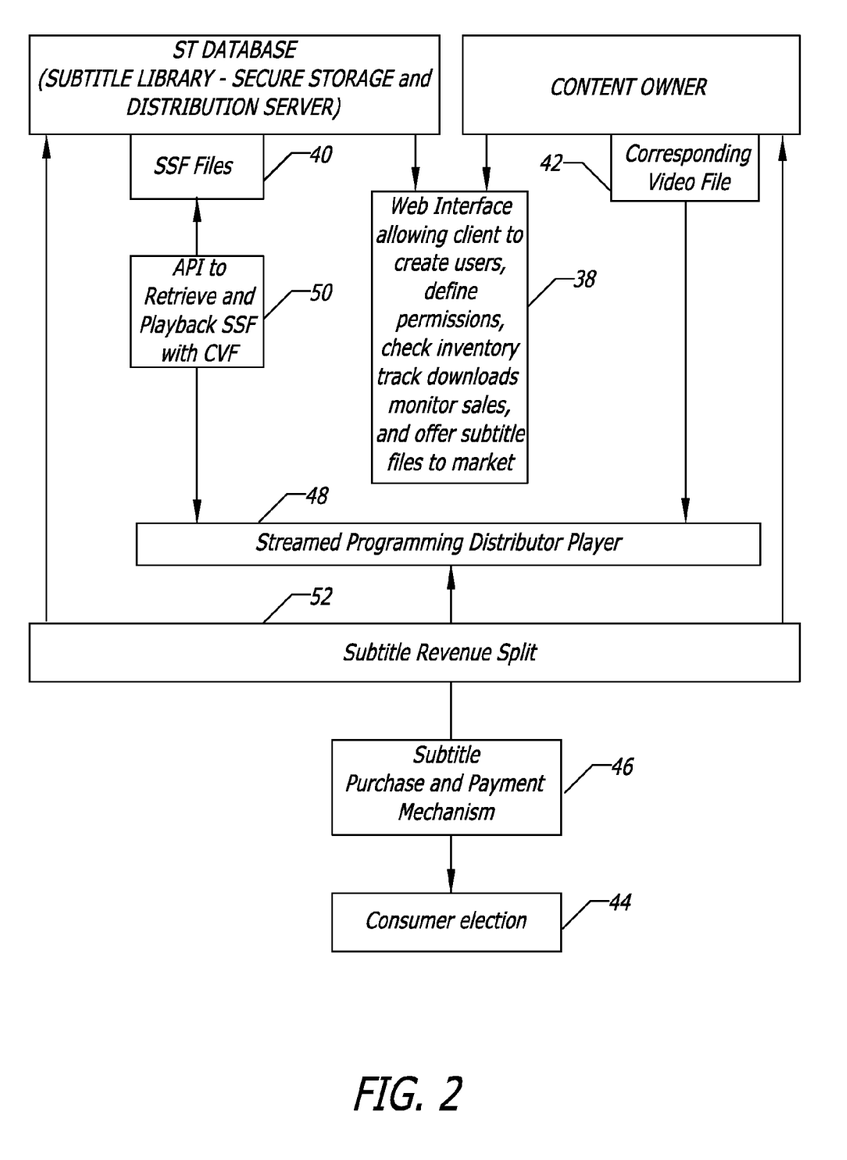
FIG. 2 is a flowchart depicting the steps taken in accordance with the present invention for offering subtitles on-demand for streamed or downloaded audiovisual content.

As shown in FIG. 2, the management system of the present invention—a secure web interface—allows the content owner or client to check and manage inventory and track use of their proprietary synchronized subtitle files (38).

Typically, the host's application programming interface (API) or other relevant retrieving, synchronization and displaying solution (50) enables consumers to watch the synchronized subtitle file in with the language of their choice for a nominal fee. Consumer's election to view subtitles (44) triggers an additional charge to the consumer. This is done via a subtitle purchase mechanism (46), wherein the provider can bill through the consumer's existing relationship with the program provider, or bill directly through a separate, host-owned and operated payment system. Upon confirmation of purchase, the distributor player (48) sends a signal to the hosts server (40) triggering synchronous streaming playback of the subtitle file either through an API or other relevant solution (50), such that synchronized streaming playback of the subtitle file or file download is used with the CVF (42). The election to view the subtitles includes security limitations derived in the purchaser's agreements, which may include, but are not limited to, the duration of the subtitle file rental period, the definition device availability (mobile, tablet, computer, etc.), the preference of subtitle color, the preference of subtitle font, the preference of subtitle size, or other limitations and options.

Thousand, if not millions, of subtitle files already exist. This represents a huge monetary value to the owners of these files if they are rekindled, such as using the system and process of the present invention. Every existing subtitle file could potentially be resold again, in rental format, and again every time a consumer clicks to buy or rent a subtitled version of any film or television content via a network. The revenue generated by the sale of the purchased subtitles is typically split between the distributor, the content owner, and the host (52). As the volume of film and television content is increasingly made available to a growing online international audience, there is anticipated to be an equally high demand for such subtitle files to be associated with the corresponding video files.

Figure 3:
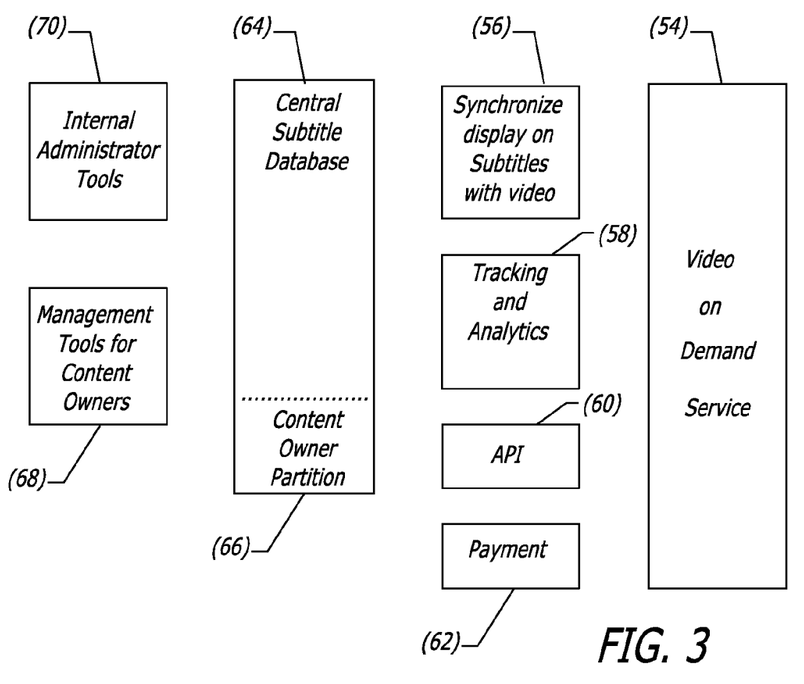
FIG. 3 is a diagram depicting the relative positions of different components and tool sets of a system implementing the inventive process.

FIG. 3 illustrates a configuration of the various components involved in providing the subtitle files for a corresponding video file. On the right side of FIG. 3 is represented a video on demand provider (54) through which a consumer would access available video files. In terms of Internet or Cloud based services, various tools are disposed in electronic communication with this video-on-demand provider. These tools include one for synchronizing the display of subtitle files with a video playback (56). The next tool is tracking and analytics (58) for tracking which subtitle files are accessed, when they are accessed, and whether the consumer is authorized for such access. Next is the application programming interface (API) (60) through which the video-on-demand system identifies the intended subtitle file necessary for the corresponding video file playback. Then is the payment management system (62) through which appropriate payments are processed for viewing the identified subtitle file. In electronic communication with each of these systems is the central subtitle database (64) which contains all of the subtitle files prepared as described above. This central subtitle database also includes the securely partitioned content owner portion (66) described above. Adjacent to this database is a management tool for the content owners (68) through which the content owners can access their secure partition on the database or otherwise monitor usage and other analytics of their subtitle files. There is also an internal administration tool (70) through which the provider of the subtitle process described herein may access and maintain the subtitle database.

Figure 4:
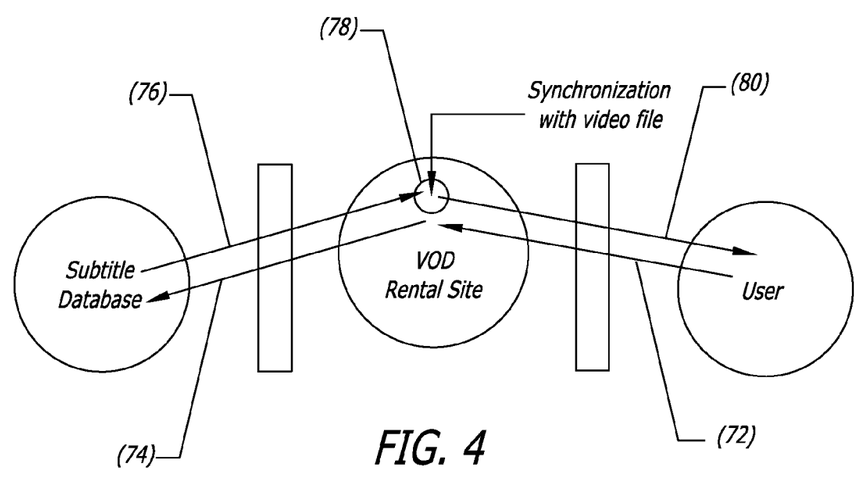
FIG. 4 is a diagram illustrating the interaction of a user with a video rental site and the implementation of a subtitle file from the database of the present invention.

FIG. 4 illustrates the interaction between a consumer or user and the video rental site with the subtitle database. In this illustration, the user accesses (72) the video rental site and selects a video along with its synchronized subtitle file. The video rental site then accesses (74) the subtitle database to retrieve the synchronized subtitle file for the corresponding video file. The subtitle database then transmits (76) the synchronized subtitle file to the video rental site. The synchronized subtitle file is synched (78) with the corresponding video file on the video rental site. The synched video file and synchronized subtitle file are then transmitted (80) back to the user for seamless playback. Firewalls or similar security measures separate the user from the video rental site and the video rental site from the subtitle database. Only authorized transactions are permitted to pass through these firewalls.

Although several embodiments have been described in detail for purposes of illustration, various modifications may be made without departing from the scope and spirit of the invention.

What is claimed is:

1. A process for sub-titling streaming video content, comprising the steps of:
   creating a subtitle file for a corresponding video file;
   synchronizing the subtitle file with the corresponding video file;
   storing the synchronized subtitle file in a subtitle database separate from a video database containing the corresponding video file;
   making synchronized subtitle file available to a consumer through a distribution server;
   permitting the consumer to elect to view the synchronized subtitle file; and
   displaying the elected synchronized subtitle file simultaneously with the corresponding video file;
   wherein the creating step comprises the steps of:
   receiving a dialog script for the corresponding video file;
   preparing an original language master template subtitle file using the dialog script for the corresponding video file;
   translating dial in the original language master template subtitle file from the original language into a second language;
   creating a translated subtitle file in the second language using the translated dialog, wherein the translated subtitle file is the subtitle file;
   wherein the translating step comprises the steps of:
   processing the original language master template subtitle file through an interactive statistical machine translation program; and
   generating a draft of the translated subtitle file in the second language; and
   further comprising the steps of:
   reviewing, editing and customizing the draft of the translated subtitle file consistent with a format of the original language master template subtitle file; and
   implementing translation memory in the interactive statistical machine translation program to alter an algorithm of the program consistent with syntax, word choice and style preferences indicated by the reviewing, editing and customizing step.

2. A process for sub-titling streaming video content, comprising the steps of:
creatin a subtitle file for a corresponding video file, wherein the subtitle file comprises a plurality of subtitle files in multiple languages;
synchronizing the subtitle file with the corresponding video file;
storing the synchronized subtitle file in a subtitle database separate from a video database containing the corresponding video file;
making the synchronized subtitle file available to a consumer through a distribution server;
permitting the consumer to elect to view the synchronized subtitle file;
displaying the elected synchronized subtitle file simultaneously with the corresponding video file;
reversioning the video file for a specific geographic territory or country; and
recutting the original language master template subtitle file to match the reversioned video file.

3. A process for sub-titling streaming video content, comprising the steps of:
creatin a subtitle file for a corresponding video file;
synchronizing the subtitle file with the corresponding video file;
storing the synchronized subtitle file in a subtitle database separate from a video database containing the corresponding video file;
making the synchronized subtitle file available to a consumer through a distribution server;
permitting the consumer to elect to view the synchronized subtitle file;
displaying the elected synchronized subtitle file simultaneously with the corresponding video file; and
performing a quality check of the synchronized subtitle file with the corresponding video file for technical specifications, synchronization, check sum, duration, and predetermined identification codes.

4. A process for sub-titling streaming video content, comprising the steps of:
creating a subtitle file for a corresponding video file;
synchronizing the subtitle file with the corresponding video file;
storing the synchronized subtitle file in a subtitle database separate from a video database containing the corresponding video file;
making the synchronized subtitle file available to a consumer through a distribution server;
permitting the consumer to elect to view the synchronized subtitle file; and
displaying the elected synchronized subtitle file simultaneously with the corresponding video file;
wherein the displaying step comprises the steps of:
accessing the synchronized subtitle file on the subtitle database,
synching playback of the synchronized subtitle file with playback of the corresponding video file on the distribution server; and
permitting streaming of the synched playback of the synchronized subtitle file and the corresponding video file from the distribution server on a video playback device.

5. A process for sub-titling streaming video content, comprising the steps of:
creating a subtitle file for a corresponding video file;
synchronizing the subtitle the with the corresponding video file;
storing the synchronized subtitle file in a subtitle database separate from a video database containing the corresponding video file;
making the synchronized subtitle file available to a consumer through a distribution server;
permitting the consumer to elect to view the synchronized subtitle file;
displaying the elected synchronized subtitle file simultaneous with the corresponding video file;
securely partitioning the subtitle database to have a secure work server for a content owner;
permitting the content owner to post the corresponding video file and an original subtitle on the secure work server;
processing the original subtitle file to verify its contents, translate into a second language, or modify to synchronize with the corresponding video file;
evaluating the processed subtitle file to confirm the accuracy of the processing step; and
assigning a synchronized subtitle file code to the processed subtitle file.

6. The process of claim 5, further comprising the steps of:
correcting the subtitle file if it is determined that the processing step was not accurate; and
repeating the evaluating step on the corrected subtitle file.

7. A process for sub-titling streaming video content, comprising the steps of:
creating a subtitle file for a corresponding video file;
synchronizing the subtitle file with the corresponding video file;
storing the synchronized subtitle file in a subtitle database separate from a video database containing the corresponding video file;
making the synchronized subtitle file available to a consumer through a distribution server;
permitting the consumer to elect to view the synchronized subtitle file;
displaying the elected synchronized subtitle file simultaneously with the corresponding video file; and
billing the consumer through a video provider for viewing the synchronized subtitle file.

8. A process for sub-titling streaming video content, comprising the steps of:
creating a subtitle file for a corresponding video file;
synchronizing the subtitle file with the corresponding video file;
storing the synchronized subtitle file in a subtitle database separate from a video database containing the corresponding video file;
making the synchronized subtitle file available to a consumer through a distribution server;
permitting the consumer to elect to view the synchronized subtitle file;
displaying the elected synchronized subtitle file simultaneously with the corresponding video file; and
limiting the availability of the synchronized subtitle file to a predetermined rental duration or a specified video playback device.

9. A process for sub-titling streaming video content, comprising the steps of:
creating a plurality of subtitle files in multiple languages for a corresponding video file;
synchronizing each of the plurality of subtitle files with the corresponding video file;

storing the plurality of synchronized subtitle files in a subtitle database separate from a video database containing the corresponding video file;

making the plurality of synchronized subtitle files available to a consumer through a distribution server;

permitting the consumer to elect to view one of the plurality of synchronized subtitle files in a selected language; and displaying the elected synchronized subtitle file in the selected language simultaneously with the corresponding video file.

10. The process of claim 9, wherein the creating step comprises the steps of:

receiving a dialog script for the corresponding video file;

preparing an original language master template subtitle file using the dialog script for the corresponding video file;

translating dialog in the original language master template subtitle file from the original language into a second language;

creating a translated subtitle file in the second language using the translated dialog, wherein the translated subtitle file is the subtitle file.

11. The process of claim 10, repeating the translating and creating steps for a third language.

12. The process of claim 10, wherein the translating step comprises the steps of:

processing the original language master template subtitle file through an interactive statistical machine translation program; and generating a draft of the translated subtitle file in the second language.

13. The process of claim 12, further comprising the step of reviewing, editing and customizing the draft of the translated subtitle file consistent with a format of the original language master template subtitle file.

14. The process of claim 13, further comprising the step of implementing translation memory in the interactive statistical machine translation program to alter an algorithm of the program consistent with syntax, word choice and style preferences indicated by the reviewing, editing and customizing step.

15. The process of claim 9, further comprising the steps of:

reversioning the video file for a specific geographic territory or country; and recutting the original language master template subtitle file to match the reversioned video file.

16. The process of claim 9, further comprising the step of performing a quality check of the synchronized subtitle file with the corresponding video file for technical specifications, synchronization, check sum, duration, and predetermined identification codes.

17. The process of claim 9, wherein the displaying step comprises the steps of:

accessing the synchronized subtitle file on the subtitle database, synching playback of the synchronized subtitle file with playback of the corresponding video file on the distribution server; and permitting streaming of the synched playback of the synchronized subtitle file and the corresponding video file from the distribution server on a video playback device.

18. The process of claim 9, further comprising the steps of:

securely partitioning the subtitle database to have a secure work server for a content owner;

permitting the content owner to post the corresponding video file and an original subtitle on the secure work server;

processing the original subtitle file to verify its contents, translate into a second language, or modify to synchronize with the corresponding video file;

evaluating the processed subtitle file to confirm the accuracy of the processing step; and assigning a synchronized subtitle file code to the processed subtitle file.

19. The process of claim 18, further comprising the steps of:

correcting the subtitle file if it is determined that the processing step was not accurate; and repeating the evaluating step on the corrected subtitle file.

20. The process of claim 9, further comprising the step of billing the consumer through a video provider for viewing the synchronized subtitle file.

21. The process of claim 9, further comprising the step of limiting the availability of the synchronized subtitle file to a predetermined rental duration or a specified video playback device.

22. A process for sub-titling streaming video content, comprising the steps of:

receiving a dialog script for a corresponding video file;

preparing an original language master template subtitle file using the dialog script for the corresponding video file;

translating dialog in the original language master template subtitle file from the original language into a second language;

repeating the translating step for each of multiple languages;

creating a plurality of subtitle files in the second language and each of the multiple languages for the corresponding video file;

synchronizing each of the plurality of subtitle files with the corresponding video file;

storing the plurality of synchronized subtitle files in a subtitle database separate from a video database containing the corresponding video file;

making the plurality of synchronized subtitle files available to a consumer through a distribution server;

permitting the consumer to elect to view one of the plurality of synchronized subtitle files in a selected language; and displaying the elected synchronized subtitle file in the selected language simultaneously with the corresponding video file.

23. The process of claim 22, wherein the translating step comprises the steps of:

processing the original language master template subtitle file through an interactive statistical machine translation program; and generating a draft of the translated subtitle file in the second language and each of the multiple languages.

24. The process of claim 23, further comprising the step of reviewing, editing and customizing the draft of the translated subtitle file consistent with a format of the original language master template subtitle file.

25. The process of claim 24, further comprising the step of implementing translation memory in the interactive statistical machine translation program to alter an algorithm of the program consistent with syntax, word choice and style preferences indicated by the reviewing, editing and customizing step.

26. The process of claim 22, further comprising the steps of:

reversioning the video file for a specific geographic territory or country; and recutting the original language master template subtitle file to match the reversioned video file.

27. The process of claim 22, further comprising the step of performing a quality check of the synchronized subtitle file with the corresponding video file for technical specifications, synchronization, check sum, duration, and predetermined identification codes.

28. The process of claim 22, wherein the displaying step comprises the steps of:
- accessing the synchronized subtitle file on the subtitle database,
- synching playback of the synchronized subtitle file with playback of the corresponding video file on the distribution server; and
- permitting streaming of the synched playback of the synchronized subtitle file and the corresponding video file from the distribution server on a video playback device.

29. The process of claim 22, further comprising the steps of:
- securely partitioning the subtitle database to have a secure work server for a content owner;
- permitting the content owner to post the corresponding video file and an original subtitle on the secure work server;
- processing the original subtitle file to verify its contents, translate into a second language, or modify to synchronize with the corresponding video file;
- evaluating the processed subtitle file to confirm the accuracy of the processing step; and
- assigning a synchronized subtitle file code to the processed subtitle file.

30. The process of claim 29, further comprising the steps of:
- correcting the subtitle file if it is determined that the processing step was not accurate; and
- repeating the evaluating step on the corrected subtitle file.

31. The process of claim 22, further comprising the step of billing the consumer through a video provider for viewing the synchronized subtitle file.

32. The process of claim 22, further comprising the step of limiting the availability of the synchronized subtitle file to a predetermined rental duration or a specified video playback device.

* * * * *